Aug. 10, 1948.                    E. P. PALMATIER                    2,446,663
                           FAN DEICING OR ANTI-ICING MEANS
Filed Jan. 11, 1944                                              4 Sheets-Sheet 1
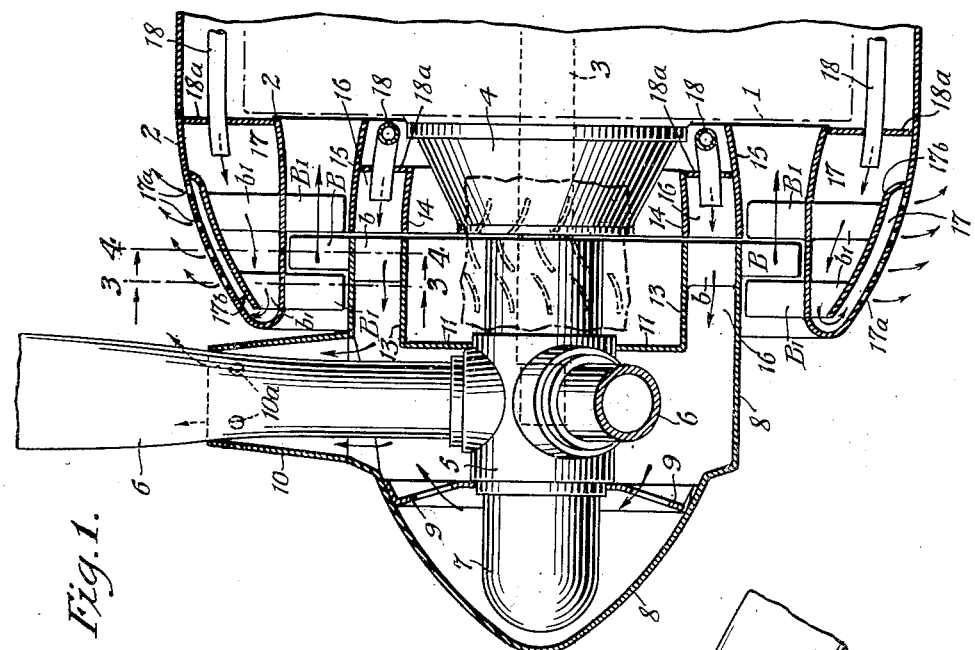
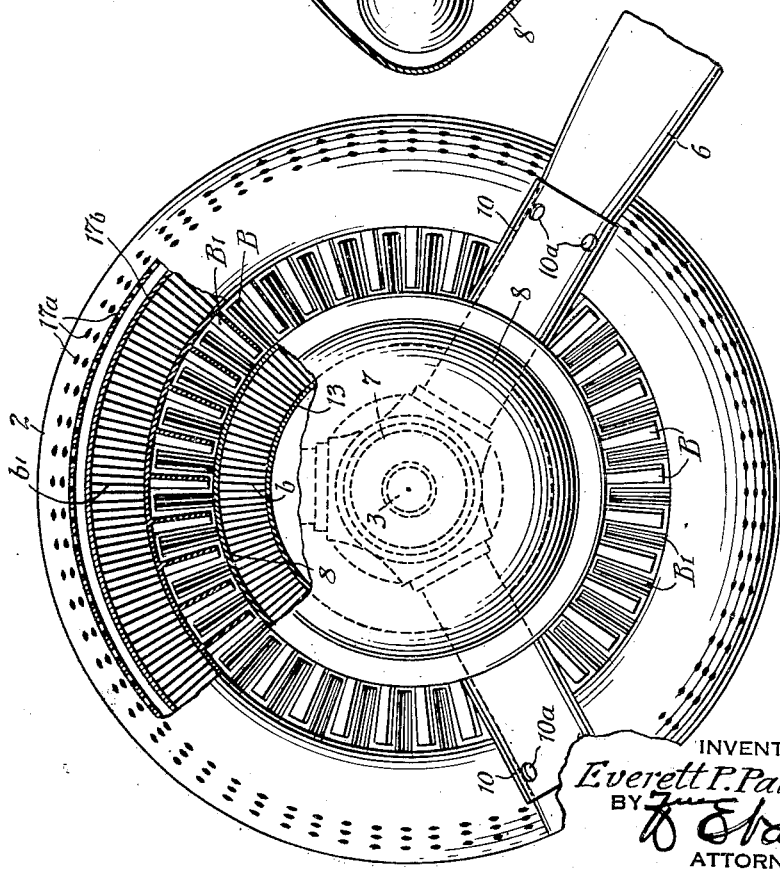
INVENTOR
Everett P. Palmatier
BY
ATTORNEY Aug. 10, 1948.  E. P. PALMATIER  2,446,663
FAN DEICING OR ANTI-ICING MEANS
Filed Jan. 11, 1944  4 Sheets-Sheet 2

INVENTOR
*Everett P. Palmatier*
BY
ATTORNEY

Aug. 10, 1948.　　　　E. P. PALMATIER　　　　2,446,663
FAN DEICING OR ANTI-ICING MEANS
Filed Jan. 11, 1944　　　　　　　　　　　　　4 Sheets-Sheet 3
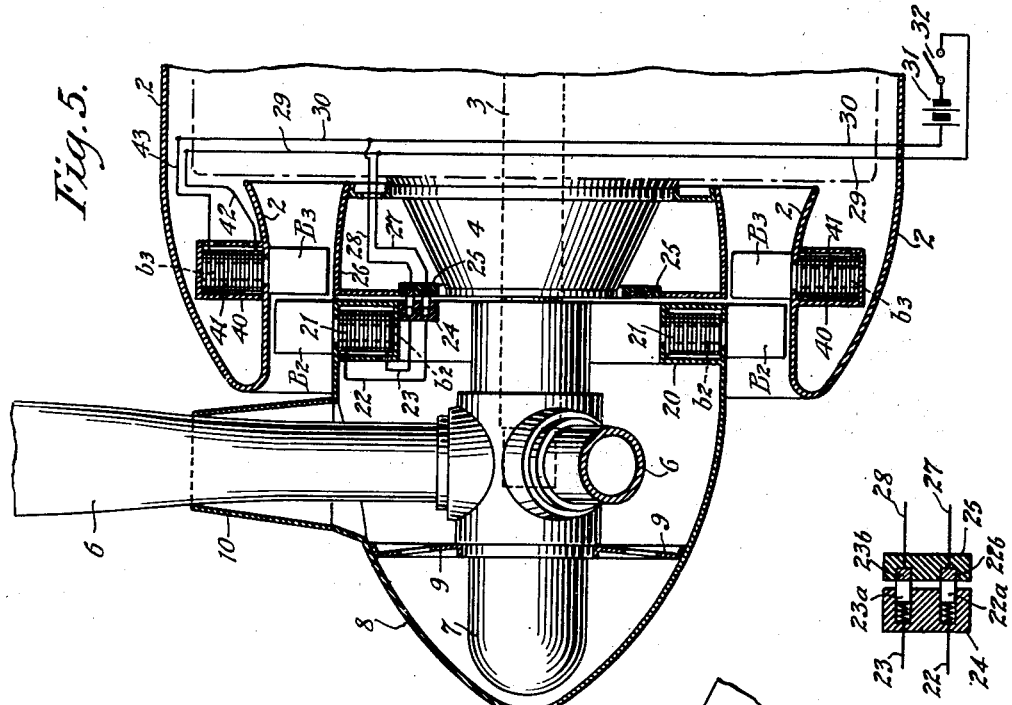
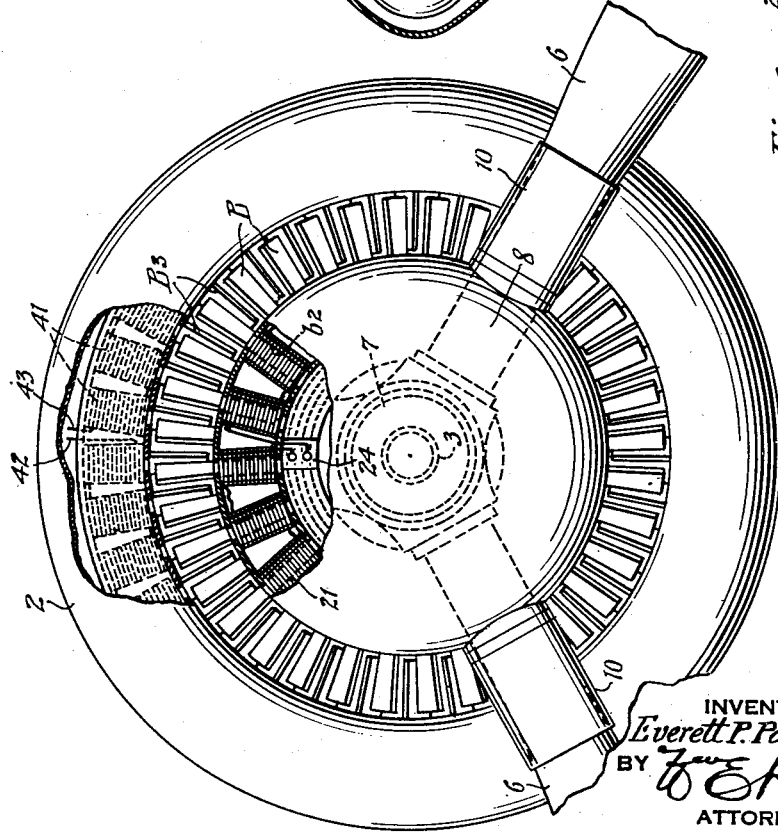
INVENTOR
Everett P. Palmatier
BY
ATTORNEY

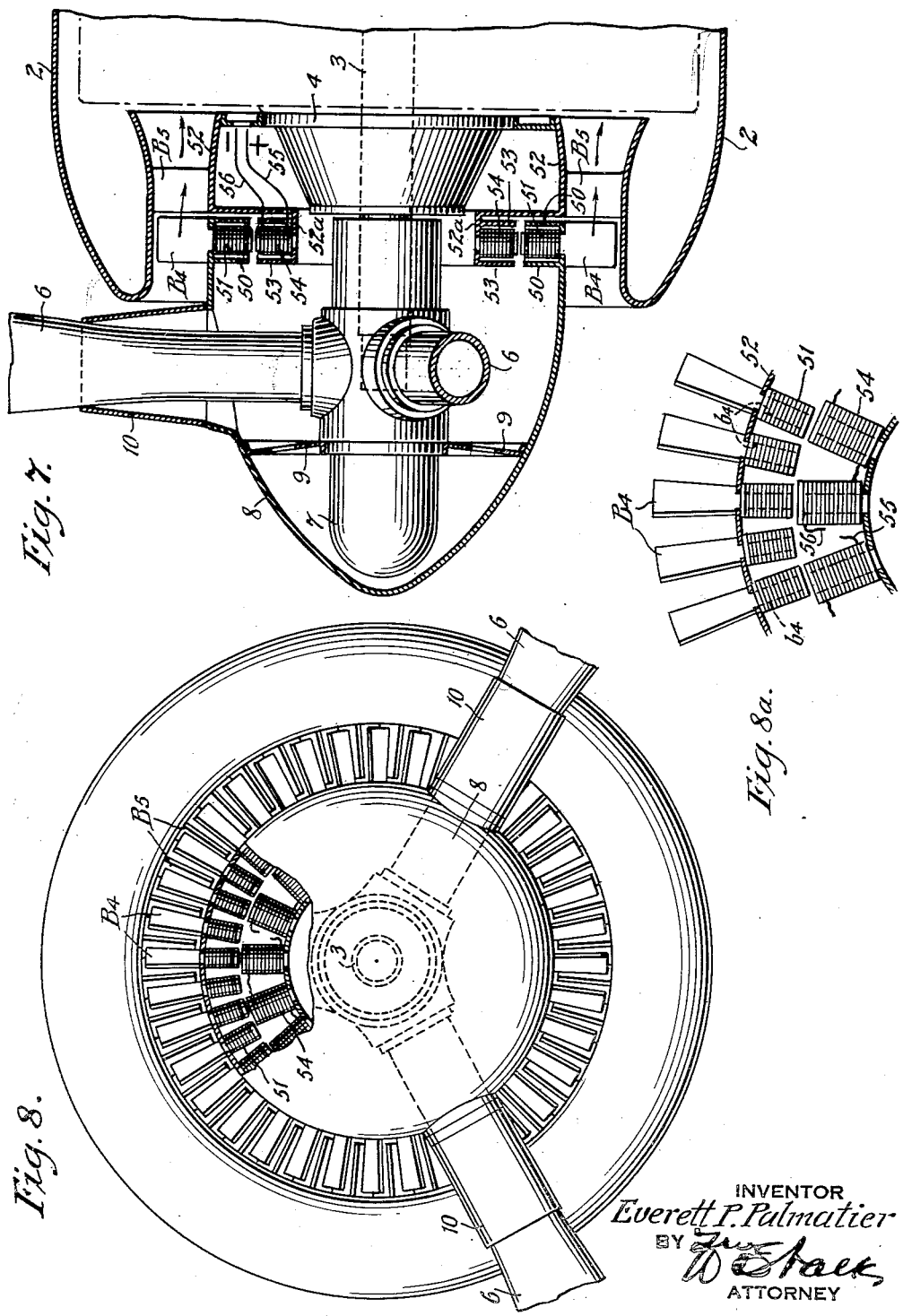

Patented Aug. 10, 1948

2,446,663

UNITED STATES PATENT OFFICE 2,446,663

FAN DEICING OR ANTI-ICING MEANS

Everett P. Palmatier, Upper Montclair, N. J., assignor to Curtiss-Wright Corporation, a corporation of Delaware Application January 11, 1944, Serial No. 517,875

6 Claims. (Cl. 244—134)

My invention relates to de-icing or anti-icing arrangements for a fan driven by an aircraft engine.

In accordance with my invention, the fan blades of a fan operable, for example, for engine-cooling or for increasing the pressure of a stream of air are provided, respectively, with extending sections or fins which, in suitable manner, are heated, the heat thus produced traveling conductively to the respective fan blades for de-icing purposes.

More particularly, in accordance with my invention, the fan blade extending sections are heated by the action of hot gases thereon, directly or indirectly by electricity, or otherwise as may be suitable.

Various other objects, advantages and features of my invention will become apparent from the following detailed description.

My invention resides in the fan de-icing or anti-icing means, features and arrangements of the character hereinafter described and claimed.

For an understanding of my invention and for an illustration of some of the many forms thereof, reference is to be had to the accompanying drawings, in which:

Figure 1 is a vertical sectional view, partly in elevation, showing an aircraft having my novel fan de-icing or anti-icing system associated therewith;

Fig. 2 is a front elevational view, partly in elevation, of the system shown in Fig. 1;

Figure 4:
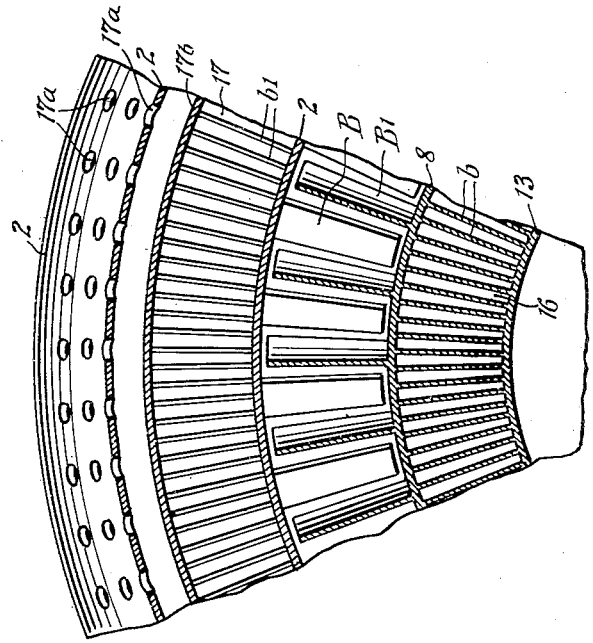
Figure 3:
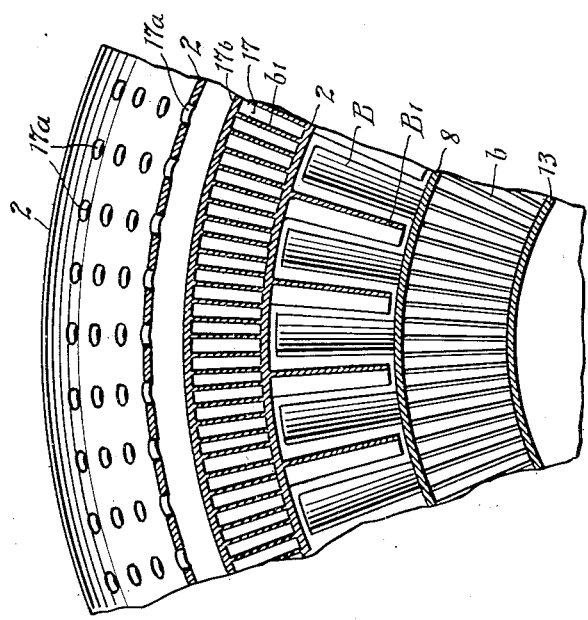

Figs. 3 and 4 are transverse, vertical sectional views, partly in elevation, taken on the respective lines 3—3 and 4—4 of Fig. 1 looking in the direction of the arrows;

Fig. 5 is a vertical sectional view, partly in elevation, showing an aircraft having another form of novel de-icing or anti-icing system associated therewith;

Fig. 6 is a front elevational view, partly in section, of the system shown in Fig. 5;

Fig. 6a is a fragmentary, enlarged sectional view of the slip ring mechanism shown in Fig. 5;

Fig. 7 is a vertical sectional view, partly in elevation, showing an aircraft having another form of novel de-icing or anti-icing system associated therewith;

Fig. 8 is a front elevational view, partly in section, of the system shown in Fig. 7; and Fig. 8a is a fragmentary, enlarged sectional view of the system shown in Figs. 7 and 8.

Referring to Fig. 1, 1 designates the aircraft engine with which, in suitable manner, a circular cowling 2 is associated. The engine 1 operates the propeller shaft 3 which extends forwardly beyond the engine nose 4 and there carries the propeller hub 5 having the propeller blades 6 projecting therefrom. Associated with the hub 5 is a housing 7 for the motor and associated apparatus operative, as known in the art, for changing the pitch of the propeller blades 6. A spinner 8 encloses the hub 5 and housing 7, the blades 6 extending through the respective openings provided therefor in the spinner 8 which, in a conventional manner, is secured to the hub 5 as indicated at 9 whereby said hub 5 and the spinner 8 are rotatable together as a unit. Associated with each propeller blade 6 is a cuff 10 which, in suitable manner as known in the art, is anchored in operative position.

Supported in suitable manner as hereinafter described are the rotatable fan blades B which form the fan rotor, the blades B being angularly related in suitable manner to the path of movement thereof through the air so that, when rotated, they direct a stream of air rearwardly toward the engine 1. Disposed forwardly and rearwardly of the rotor blades B are the respective sets of fixed fan blades B1 which form circular stators, the stator blades B1 being angularly related in suitable manner to the rotor blades B.

In accordance with the invention, a disk 11 is provided with a central opening which receives the hub 5 in close-fitting relation, said disk 11 being secured to the hub 5 by any suitable means, not shown. The disk 11 comprises a rearwardly extending circular member 13 which is spaced from the adjacent circular section of the spinner 8. Disposed in alinement with the member 13 is a circular member 14 which is suitably secured to the engine 1 or the nose 4 thereof. A circular member 15 fastened in suitable manner to the engine 1 or other fixed structure forms, with the rear section of the spinner 8, the outer surface of a circular channel 16 having its inner surface defined by the members 14 and 15.

Each of the rotor blades B, formed if desired from suitable metallic material, comprises a plurality of inwardly extending sections or fins $b$ disposed in the channel 16, each blade B and its extending sections $b$ preferably being integral with each other and being secured in suitable manner to the rear section of the spinner 8 and the circular member 13. Each blade section or fin $b$ is of plate-like character and, as shown in Figs. 3 and 4, these blade sections or fins $b$ are arranged in side-by-side relation.

The cowling 2, hereinbefore referred to, may be and preferably is generally of the same character as known in the art. That is, the cowling 2 defines a circular chamber or channel 17 having outlet passages 17a formed in the outer wall thereof, direct communication with these passages 17a being prevented by a circular baffle plate 17b which terminates adjacent the front end of said cowling 2.

Each of the stator blades B1, formed if desired from suitable metallic material, comprises a plurality of outwardly extending sections or fins b1 disposed in the cowling channel 17, each blade B1 and its extending sections or fins b1 preferably being integral with each other. In the example shown, the front and rear stator blades B1 and the respective sets of extending fins or sections b1 thereof are secured in suitable manner to the inner section of the cowling 2 and to the baffle plate 17b.

When the aircraft engine 1 is in operation, the shaft 3, the hub 5, the propeller blades 6, the spinner 8 and the rotor blades B rotate as a unit. Accordingly, by the rotor blades B, a stream of air is directed rearwardly, toward the engine in the type of airplane herein disclosed, and, before such stream of air reaches said engine 1, it is suitably deflected by the rear stator blades B1.

During flight of the aircraft and when it becomes necessary to subject the fan blades B and B1 to a de-icing operation, hot gases or a suitable hot gaseous medium is passed under suitable pressure into the aforesaid circular channels 16 and 17, said hot gaseous medium being thus supplied to said channels, in the example shown, through a plurality of pipes 18 arranged in suitable spaced relation throughout the circular length of each of said channels 16 and 17, these pipes passing through openings provided, respectively, therefor in circular members 18a suitably secured in position as shown. Preferably, although not necessarily, the described hot gaseous medium is heated air obtained as disclosed in my pending application Serial No. 503,143, filed September 20, 1943.

In the channels 16 and 17, the heated air travels in a forward direction to thereby heat the extending sections b and b1 of the respective sets of fan blades B and B1. The heat thus produced in said extending sections b and b1 travels conductively to the respective fan blades B, B1 and elevates the temperature thereof so as to melt such ice as may have formed thereon.

It will be understood that, should the aircraft pilot obtain knowledge that he is approaching an area where icing conditions may exist, operation of the de-icing system may be initiated to thereby heat the fan blades in advance and positively prevent the formation of ice on said blades.

With the invention as disclosed, although not necessarily, the heated air traversing the channel 16, after passage thereof beyond the blade extending sections b, engages the interior surface of the spinner 8, passes outwardly through the cuffs 10 and thence to the atmosphere by way of the cuff passages 10a whereby the spinner, to some extent, and the cuffs 10 are de-iced. As regards said cuffs 10, they function, by centrifugal action, to assist the passage of the heated air through the channel 16. Further, as illustrated, the baffle plate 17b causes the heated air traversing the channel 17 to reach the front area of the cowling 2 and, subsequently, such air escapes to the atmosphere by way of the passages 17a.

In the form of my invention shown in Figs. 5 and 6, a U-shaped chamber-forming member 20 having circular configuration is secured in suitable manner to the interior surface of the spinner 8 at the rear thereof. Suitably mounted on the rear surface of said spinner 8 are a plurality of rotatable fan blades B2, each fan blade having an extending section or fin b2 preferably formed integrally therewith and disposed in the space bounded by said member 20 and the spinner end section.

In accordance with the invention, each blade fin or extending section b2 carries a coil or winding 21. As indicated in Fig. 6, the coils 21 are connected in series relation and, for connecting them in circuit with a suitable source of electrical energy, the outer terminal of one of said coils 21 has connected thereto a conductor 22, the inner terminal of the adjacent coil 21 having a conductor 23 connected thereto. The conductors 22 and 23 terminate in the respective spring-pressed contact members 22a, 23a carried by a block of suitable electricity-insulating material 24 secured in suitable manner to the member 20 for rotatable movement therewith. Disposed adjacent the block 24 is a ring 25 formed, likewise, from suitable electricity-insulating material and secured in suitable manner to an angular member 26 which, in turn, is fastened in fixed position in any suitable manner, as by attachment to the engine nose 4. The ring 25 carries a pair of spaced electricity-conducting rings 22b, 23b which face and are engaged by the respective contact members 22a, 23a. The rings 22b, 23b have connected thereto the respective conductors 27, 28 which are connected, respectively, to conductors 29, 30 having included therebetween a battery 31 or other suitable source of electrical energy together with a control switch 32.

Further with respect to the form of my invention shown in Figs. 5 and 6, a U-shaped chamber-forming member 40 having circular configuration is suitably secured to the inner section of the cowling 2 in outwardly projecting relation. Suitably mounted on said inner section of the cowling 2 are a plurality of fixed fan blades B3, each fan blade having an extending section or fin b3 preferably formed integrally therewith and disposed in the space bounded by said member 40 and the adjacent section of said cowling 2. In accordance with the invention, each blade extending section b3 carries a coil or winding 41. As indicated in Fig. 6, the coils 41 are connected in series relation and, for connecting them in circuit relation with the aforesaid battery 31, the inner terminal of one of said coils 41 has connected thereto a conductor 42, the outer terminal of the adjacent coil 41 having a conductor 43 connected thereto. As shown in Fig. 5, the conductors 42 and 43 are connected, respectively, to the hereinbefore described conductors 29 and 30.

When, during flight, it becomes desirable for the aircraft pilot to subject the rotor fan blades B2 and the stator fan blades B3 of Figs. 5 and 6 to a de-icing operation, the switch 32 is closed to thereby supply electrical current to all of the coils 21 and 41. Passage of the electrical current through said coils results in the generation of heat and this heat is transmitted to the respective blade extensions b2, b3 to elevate the temperature thereof. As with the form of my invention first described, the heat which is thus produced in said extending sections b2 and b3 travels conductively to the respective fan blades B2, B3 and elevates the temperature thereof so as to melt such ice as may have formed thereon or, if ice has not formed, to positively prevent formation of ice while the aircraft is in an area where icing conditions obtain.

In the form of my invention shown in Figs. 7, 8 and 8a, the rear section of the spinner 8 is shown as having secured thereto a pair of inwardly extending, spaced chamber-forming members 50, 50 having circular configuration. Suitably secured to said rear cowling section are a plurality of rotatable fan blades B4, each fan blade having an extending section or fin b4 preferably formed integrally therewith and disposed in the space defined by the members 50, 50. In accordance with the invention, each extending section b4 carries a coil or winding 51 and the ends of each coil are secured together; that is, each coil 51 is of the closed circuit type.

Further, as shown in Fig. 7, an angular member 52 having circular configuration is shown as mounted in fixed position in any suitable manner as, for example, by attachment to the engine nose 4. This angular member 52 terminates in a circular section 52a to which are secured a pair of outwardly extending spaced chamber-forming members 53, 53 disposed in alinement with the respective members 50, 50. Suitably secured to the section 52a of the member 52 are a plurality of coils or windings 54 which are disposed within the space defined by the members 53, 53 and which project toward and terminate closely adjacent the aforesaid coils 51. As indicated in Fig. 8, the windings 54 are connected in series relation and, for connecting said windings 54 in circuit with a battery or equivalent, the inner terminal of one of said coils 54 has connected thereto a conductor 55, the outer terminal of the adjacent coil 54 having a conductor 56 connected thereto. As will be understood, the conductors 55 and 56 may be connected, as indicated generally in Fig. 5 in circuit with a switch-controlled source of electrical energy.

In the form of my invention shown in Figs. 7 and 8, a series of fan blades B5, forming a fan stator, are shown as secured to the cowling 2 and the member 52. These fan blades B5 may be de-iced in any suitable manner, for example, as illustrated in Figs. 5 and 6.

When, during flight, it becomes desirable for the aircraft pilot to subject the rotor fan blades B4 to a de-icing operation, the circuit of the conductors 55, 56 is closed to thereby supply electrical current to all of the coils 54. As stated, the coils 51 are secured to the spinner 8 and rotate therewith at high speed with respect to the coils 54 which are fixed to the engine nose 4 or otherwise as may be convenient. The coils 51 are of the closed-circuit type whereas the coils 54 are electrically energized as stated above. Therefore, by reason of the described relative movement between the two sets of coils, an electrical current is induced in each of the coils 51, such electrical current heating the blade fin b4 which extends through the asociated closed-circuit coil. As with the forms of my invention previously described, the heat which is thus produced in each extending section b4 travels conductively to the associated fan blade B4 and elevates the temperature thereof for the purposes hereinbefore described.

With respect to the forms of my invention shown in Figs. 5-8 inclusive, I have described the respective sets of coils 21, 41 and 54 as connected in series relation. Alternatively, it shall be understood that the coils of each set may be connected in parallel relation with each other if desired.

It is a feature of my invention that the fins of the respective fan blades are effectively shielded because disposed in chambers which are largely or substantially closed. This is advantageous because conserving the generated heat for its intended purpose.

As regards the forms of my invention illustrated in Figs. 5-8 inclusive, it will be understood that the chambers in which the various coils or windings are disposed should contain suitable heat-insulating material, not shown, such material serving, as will be understood, to conserve the generated heat.

With each form of my invention as described, the fan arrangement comprises a rotor and, in addition, either one or two stators. It shall be understood that my invention is not to be limited to the use of a stator since, if desired, one or both of the stators may be omitted and the desired de-icing arrangement applied only to the fan blades of the rotor.

In the appended claims, the expression "de-icing" shall be understood as describing true de-icing wherein that ice is melted which, previously, had been formed on the fan blades and said expression shall also be understood as describing an operation wherein the blades are heated in accordance with the invention to positively prevent the formation of ice thereon.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In an aircraft a set of annularly arranged stator blades, a set of annularly arranged fan blades coaxial therewith, an annular cowl masking outer portions of the stator blades, an annular cowl masking inner portions of the fan blades, said cowls defining an annular air passage occupied by the inner portions of the stator blades and the outer portions of the fan blades, heating means for the masked portions of the fan blades, and heating means for the masked portions of the stator and fan blades, the heat thus imparted to said portions traveling conductively to the air-exposed parts of the blades for de-icing purposes.

2. In an aircraft, a set of fan blades forming a fan stator, a set of fan blades forming a fan rotor, means for rotating said fan rotor, each fan blade having an extending section, the extending sections of the rotor fan blades projecting in one direction and the extending sections of the stator fan blades projecting in the opposite direction, and means for heating the extending sections, the heat thus produced in said extending sections traveling conductively to the respective fan blades for de-icing purposes.

3. In combination, a support, a fan blade carried thereby and having an exposed section together with an extending section, the exposed section of said fan blade being effective to produce a stream of flowing air and the extending section of said fan blade being substantially ineffective for that purpose, a coil encircling said extending section, and means for electrically energizing said coil to heat said extending section, the heat thus produced in said extending section traveling conductively to the exposed section of said fan blade for de-icing purposes.

4. In combination, a rotatable support, a fan blade carried thereby and having an extending section, a closed-circuit coil around said extending section, a coil disposed adjacent the path of movement of said first named coil, and means for electrically energizing said second named coil to thereby inductively generate an electrical current in said first named coil whereby said extending section is heated, the heat thus produced in said extending section traveling conductively to said fan blade for de-icing purposes.

5. In an aircraft, a hollow annular cowl ring, within which air is adapted to flow, having stator fan blades extending inwardly from the inner surface of the cowl annulus, said blades having portions extending outwardly into the cowl hollow out of engagement with the ambient air, and means to heat said portions to thereby heat said blades by heat conduction from the portions to the blades.

6. In an aircraft, an annular cowl ring, within which air is adapted to flow, having stator fan blades extending inwardly from the inner surface of the cowl annulus, said blades having portions extending outwardly into the annular cowl and out of engagement with the ambient air, and means to heat said portions to thereby heat said blades by heat conduction from the portions to the blades.

EVERETT P. PALMATIER.

REFERENCES CITED

The following references are of record in the file of this patent:

UNITED STATES PATENTS

| Number | Name | Date |
|---|---|---|
| 1,475,389 | Hyatt | Nov. 27, 1923 |
| 1,929,778 | Goddard | Oct. 10, 1933 |
| 2,110,621 | Cohen | Mar. 8, 1938 |
| 2,170,911 | Raulerson | Aug. 29, 1939 |
| 2,244,800 | Pascale | June 10, 1941 |
| 2,318,233 | Keller | May 4, 1943 |
| 2,333,053 | Stroehlen | Oct. 26, 1943 |

FOREIGN PATENTS

| Number | Country | Date |
|---|---|---|
| 525,452 | Great Britain | Aug. 28, 1940 |